US012769130B2

(12) United States Patent
Blomstedt

(10) Patent No.: US 12,769,130 B2
(45) Date of Patent: Oct. 20, 2026

(54) OPTICAL WAVEGUIDE ARRANGEMENT

(71) Applicant: DISPELIX OY, Espoo (FI)

(72) Inventor: Kasimir Blomstedt, Espoo (FI)

(73) Assignee: DISPELIX OY, Espoo (FI)

( * ) Notice: Subject to any disclaimer, the term of this patent is extended or adjusted under 35 U.S.C. 154(b) by 296 days.

(21) Appl. No.: 18/699,238

(22) PCT Filed: Oct. 6, 2022

(86) PCT No.: PCT/FI2022/050665
§ 371 (c)(1),
(2) Date: Apr. 5, 2024

(87) PCT Pub. No.: WO2023/057689
PCT Pub. Date: Apr. 13, 2023

(65) Prior Publication Data

US 2024/0411135 A1 Dec. 12, 2024

(30) Foreign Application Priority Data

Oct. 8, 2021 (FI) .................................... 20216041

(51) Int. Cl.
*G02B 27/01* (2006.01)

(52) U.S. Cl.
CPC .. *G02B 27/0172* (2013.01); *G02B 2027/0112* (2013.01)

(58) Field of Classification Search
CPC .................... G02B 27/0172; G02B 2027/0112
See application file for complete search history.

(56) References Cited

U.S. PATENT DOCUMENTS 11,520,149 B2 * 12/2022 Zhao .................. G02B 27/0172
2020/0393609 A1 * 12/2020 Blomstedt ............ G02B 6/0058

* cited by examiner

*Primary Examiner* — Lucy P Chien
(74) *Attorney, Agent, or Firm* — Maschoff Brennan

(57) ABSTRACT

According to an aspect of the present disclosure, an optical waveguide arrangement comprises: at least one light source arranged to transmit light signals to at least one optical waveguide of the optical waveguide arrangement The at least one optical waveguide is arranged to receive the light signals from the at least one light source and to convey the light signals, to generate a waveguide-based display, to generate a first image at a first focal plane of the optical waveguide arrangement when at least some of the received light signals have a set of first spectral characteristics and to generate a second image at a second focal plane of the optical waveguide arrangement when at least some of the received light signals have a set of second spectral characteristics, at least one spectral characteristic of the set of first spectral characteristics being different from the set of second spectral characteristics.

19 Claims, 6 Drawing Sheets

OPTICAL WAVEGUIDE ARRANGEMENT

FIELD

Embodiments of the present invention relate in general to an optical waveguide arrangement and more specifically to an optical waveguide arrangement for generating multiple focal planes.

BACKGROUND

Optical waveguides are capable of conveying optical frequency light. Optical, or visible, frequencies refer to light with a wavelength of about 400-700 nanometres. Optical waveguides may be employed at least in displays, wherein light from a light field may be conveyed using one or more waveguides to suitable locations for release for a user's eye or eyes.

Head-Mounted Displays, HMDs, and Head-Up Displays, HUDs, may be implemented using optical waveguide technology, e.g., for augmented reality or virtual reality type applications. In augmented reality, a user sees a view of the real world and superimposed thereon supplementary indications. In virtual reality, the user is deprived of his view into the real world and provided instead a view into a software-defined scene. In general, there is a need to provide improvements related to optical waveguide technology.

SUMMARY

According to some aspects, there is provided the subject-matter of the independent claims. Some embodiments are defined in the dependent claims.

According to a first aspect of the present invention, there is provided an optical waveguide arrangement comprising, at least one light source arranged to transmit light signals to at least one optical waveguide of the optical waveguide arrangement and the at least one optical waveguide, wherein the at least one optical waveguide is arranged to receive the light signals from the at least one light source and to convey the light signals, to generate a waveguide-based display, the at least one optical waveguide being further arranged to generate a first image at a first focal plane of the optical waveguide arrangement when at least some of the received light signals have a set of first spectral characteristics and to generate a second image at a second focal plane of the optical waveguide arrangement when at least some of the received light signals have a set of second spectral characteristics, wherein at least one spectral characteristic of the set of first spectral characteristics is different compared to the set of second spectral characteristics.

Embodiments of the first aspect may comprise at least one feature, or any combination of features, from the following bulleted list:

- wherein the set of first spectral characteristics comprises a first set of at least three distinct spectral characteristics and the set of second spectral characteristic comprises a second set of at least three distinct spectral characteristics;
- wherein one spectral characteristic of the first set of distinct spectral characteristics is the same as one spectral characteristic of the second set of distinct spectral characteristics;
- wherein all spectral characteristic of the first set of distinct spectral characteristics are different compared to the second set of distinct spectral characteristics;
- wherein the first set of distinct spectral characteristics is interleaved with the second set of distinct spectral characteristics;
- wherein each spectral characteristic in the first set of spectral characteristic and each spectral characteristic in the second set of spectral characteristic is a distinct spectral peak in visible spectrum;
- wherein gamuts corresponding to the first and second set of spectral characteristics together with the waveguide arrangement comprise a Region of Interest, ROI, representing full color images;
- wherein the first and the second sets of distinct spectral characteristics comprise the same white point of interest;
- wherein the optical waveguide arrangement is arranged to provide the waveguide-based display as a head-mounted display.

According to a second aspect of the present invention, there is provided a head-mounted display or a head-up display comprising the optical waveguide arrangement of the first aspect.

According to a third aspect of the present invention, there is provided a method for an optical waveguide arrangement, comprising, transmitting, by at least one light source, light signals to at least one optical waveguide of an optical waveguide arrangement, receiving, by the at least one optical waveguide, the light signals from the light source and conveying the light signals to a human eye, to generate a waveguide-based display and generating, by the at least one optical waveguide, a first image at a first focal plane of the optical waveguide arrangement when at least some of the received light signals have a set of first spectral characteristics and a second image at a second focal plane of the optical waveguide arrangement when at least some of the received light signals have a set of second spectral characteristics, at least one spectral characteristic of the set of first spectral characteristics being different compared to the set of second spectral characteristics According to a fourth aspect of the present invention, there is provided an apparatus, comprising at least one processing core, at least one memory including computer program code, the at least one memory and the computer program code being configured to, with the at least one processing core, cause the apparatus at least to transmit light signals to at least one optical waveguide of an optical waveguide arrangement, to generate a waveguide-based display and a first image at a first focal plane of the optical waveguide arrangement when at least some of the transmitted light signals have a set of first spectral characteristics and a second image at a second focal plane of the optical waveguide arrangement when at least some of the transmitted light signals have a set of second spectral characteristics, at least one spectral characteristic of the set of first spectral characteristics being different compared to the set of second spectral characteristics.

According to a fifth aspect of the present invention, there is provided a non-transitory computer readable medium having stored thereon a set of computer readable instructions that, when executed by at least one processor, cause an apparatus to at least transmit light signals to at least one optical waveguide of an optical waveguide arrangement, to generate a waveguide-based display and a first image at a first focal plane of the optical waveguide arrangement when at least some of the transmitted light signals have a set of first spectral characteristics and a second image at a second focal plane of the optical waveguide arrangement when at least some of the transmitted light signals have a set of second spectral characteristics, at least one spectral characteristic of the set of first spectral characteristics being different compared to the set of second spectral characteristics.

According to a sixth aspect of the present invention, there is provided a computer program comprising instructions which, when the program is executed by an apparatus, cause the apparatus at least to transmit light signals to at least one optical waveguide of an optical waveguide arrangement, to generate a waveguide-based display and a first image at a first focal plane of the optical waveguide arrangement when at least some of the transmitted light signals have a set of first spectral characteristics and a second image at a second focal plane of the optical waveguide arrangement when at least some of the transmitted light signals have a set of second spectral characteristics, at least one spectral characteristic of the set of first spectral characteristics being different compared to the set of second spectral characteristics.

EMBODIMENTS

Figure 1:
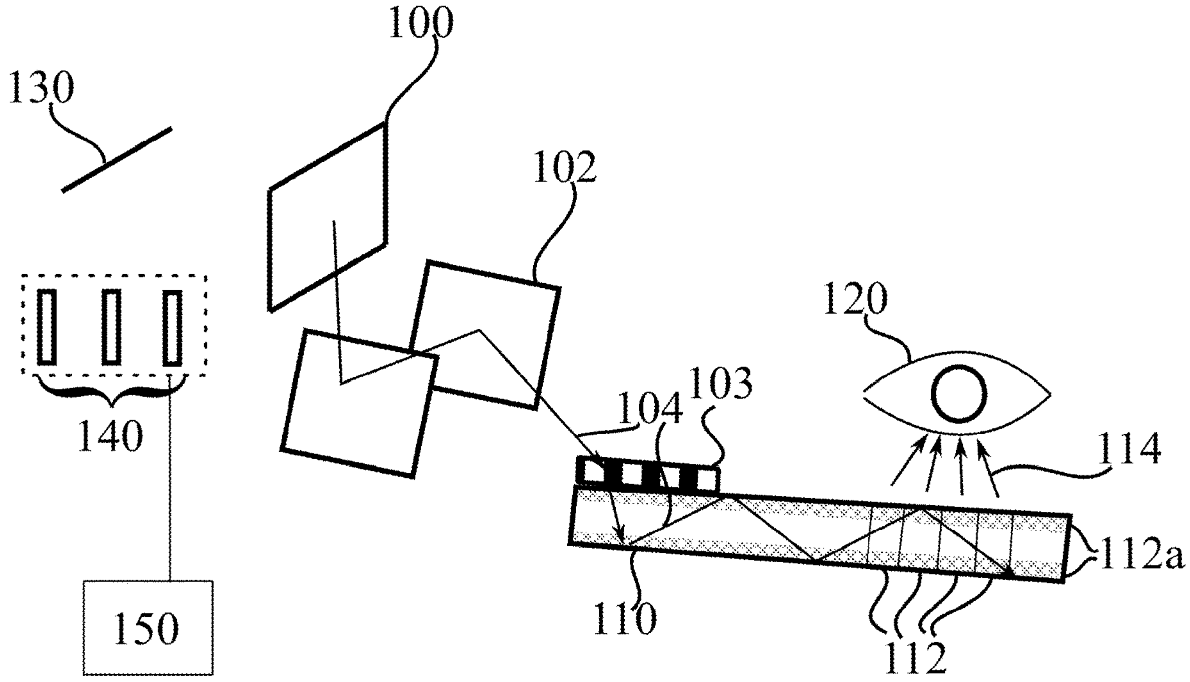
FIG. 1 illustrates an example system in accordance with at least some embodiments of the present invention.

A term "color space" may refer to the (two-dimensional) chromaticity diagram corresponding to the perceived colors resulting from the spectral response of an average human eye. The gamut of a device may be the region of the color space, which is reproducible by that device. Specifically, the gamut may correspond to the region in color space, which can be reproduced by the combination of light sources and waveguides, such as light sources 140 and waveguide 110 in FIG. 1, in the system for light fields that the observer may perceive to originate from a focal plane. The Region of Interest, ROI, in turn, may refer to a region of color space that is sufficient to reproduce what is perceived as a full color image, but may also correspond to a smaller or larger region of color space.

As a specific point in the color space can be reached by different combinations of wavelengths, a specific ROI can be reached using different combinations of distinct spectral characteristics, such as peaks in visible spectrum. A color image may be generated, for example by assuming the user's color vision perception corresponds to a standard eye and by reproducing (a part of) the corresponding color space. As is clear from the definition of the color space, the user may perceive the same color as the result of several different light signal spectra. This provides degrees of freedom to how a waveguide operates. In addition, different combinations of distinct spectral characteristics, such as wavelengths, may be used to generate the same color. How light is coupled out of the waveguide may be a function of the exit location. That is, a light ray corresponding to a specific position in the input image (specific propagation angle) may leave the waveguide at different angles depending on the exit location. In general, the user may perceive a same color from more than one spectrum of light signals. This yields degrees of freedom in manufacturing waveguide 110.

Embodiments of the present invention relate to an optical waveguide arrangement and more specifically to generating different focal planes using the optical waveguide arrangement, wherein a specific region, the ROI of the color space is reproduced at all the different focal planes. In particular, different sets of spectral characteristics may be used at different focal planes so that all the corresponding gamuts contain the ROI. That is to say, a certain set of spectral characteristics may be used to generate for example a full colour image at a certain focal plane and at least partly different set of spectral characteristics may be used to generate another full colour image at a different focal plane. Thus, the same color sensation or ROI may be realized at different focal planes by using at least partly different wavelengths at these planes. For instance, light signals having a first set of distinct spectral characteristics may be transmitted to at least one optical waveguide to generate a first full colour image at a first focal plane and light signals having a second set of distinct spectral characteristics may be transmitted to the at least one optical waveguide to generate a second full colour image at a second focal plane. In some embodiments of the present invention, a set of distinct spectral characteristics may refer to a set of peaks in visible spectrum, like a triplet of distinct wavelengths, such as a set of light components comprising red, green and blue light. The number of focal planes may be higher than two in practice. In some embodiments, partial region of a color space, or even a single color, may be sufficient.

FIG. 1 illustrates an example system in accordance with at least some embodiments of the present invention. The system may comprise a set of light sources 140. Light sources 140 may comprise laser or Light-Emitting Diode, LED, light sources, for example, wherein laser sources have the advantage that they are more strictly monochromatic than LEDs. Light sources 140 together with other optical components, for example a MEMS mirror 130, may form an optical system which may be configured to generate a light field in angular space.

The image may be encoded in the light field. The light field is schematically illustrated in FIG. 1 as field 100. In some embodiments, a physical primary display may display an image of light field 100, while in other embodiments the system may comprise no physical primary display and the image may be merely encoded in the light field which is distributed in angular space. Light signal 104, from light field 100, may be conveyed directly, or by, using optical guides 102 comprising, for example, mirrors and/or lenses, to an optical waveguide 110, to generate a waveguide-based display. The optical guides 102 are optional in the sense that depending on the specifics of a particular embodiment, they may be absent. In other words, optical guides 102 are not present in all embodiments.

Light signal 104 from a light source 140 may be directed to an in-coupling structure 103, such as a partially reflecting mirror, surface relief grating or other diffractive structures. The in-coupling structure 103 may comprise one or more in-coupling gratings and/or prisms for example. The in-coupling structure 103 may be arranged to guide the light ray 104 into the optical waveguide 110. That is to say, the in-coupling structure 103 may diffractively couple an image into the optical waveguide 110. As shown in FIG. 1, in some embodiments, the in-coupling structure 103 may be on a surface, or close to the surface, of the optical waveguide 110 for example. However, in some embodiments the optical waveguide 110 may comprise the in-coupling structure 103. In some embodiments, light 104 may be in-coupled from the edge of the waveguide.

In some embodiments, the in-coupling structure 103 may be absent though and in such cases it is, for example, possible to get the light signal 104 into the optical waveguide 110 by illuminating a side surface of the optical waveguide 110 directly.

In the waveguide 110, the light signal 104 may advance by being reflected repeatedly inside the waveguide, interacting with elements 112*a* until it interacts with elements 112, which may cause the light signal 104 to be deflected from waveguide 110 to air, toward eye 120 as image producing light signals 114. Elements 112*a* and 112 may be located on either side or both sides of the optical waveguide 110, wherein a side of the optical waveguide 110 refers to the side which is towards the eye 120 or to the "outside world" side.

Elements 112 and 112*a* may comprise partially reflecting mirrors, surface relief gratings or other diffractive structures, for example. Elements 112*a* may be arranged, for example, to spread light field 100 inside waveguide 110 such that the image of the waveguide display is correctly generated. Light from different angular aspects of light field 100 may interact with elements 112 so that light signals 114 will produce the image encoded in light field 100 on the retina of an eye 120.

Elements 112 may cause the light signal 104 to leave the waveguide 110 at multiple exit locations. As a consequence, the user will perceive the image encoded in light field 100 in front of his eyes 120. As the waveguide 110 may be, at least in part, transparent, the user may also advantageously see his real-life surroundings through waveguide 110 in case the waveguide-based display is head-mounted, for example. Light is released from the waveguide 110 as a consequence of the action of the elements 112, i.e., elements 112 may be referred to as out-coupling elements or structures.

The example system illustrated in FIG. 1 comprises three light sources 140 and at least one processor 150 may be configured to control the light sources 140. This is an example to which the present disclosure is not limited, rather, there may be fewer than three, or more than three, light sources 140. The light sources 140 may be considered as monochromatic in the sense that they may produce either narrow spectral band of light with a single peak wavelength, as in lasers, or their spectral band may be wider, as with LEDs. Light sources with more complicated spectral distributions are also possible.

To produce a colour image encoded in the light field 100 in angular space, the light sources 140 may, for example, be programmatically controlled. In instances where the mirror 130 is present, the light sources 140 and the mirror 130 may be synchronized with each other such that light from the light sources 140 illuminates specific angular regions of the angular space 100 in a controlled manner, to produce therein a representation of a colour image which reproduces a still or moving input image received from an external source, such as, for example, a virtual reality or augmented reality computer. The still or moving image received from the external source may comprise a digital image or a digital video feed, for example. The image encoded in light field 100 is thus configurable by provision of a suitably selected input image.

To produce a specific colour at a given aspect in angular space of the light field 100, this given aspect in the angular space may be illuminated by a set of at least three light sources 140 for example. This specific colour may then be reproduced by the light signals 114, as light from the given aspect in the angular space of light field 100 proceeds in waveguide 110 to an element 112, possibly via elements 112*a*, where it exists at angle corresponding to the given aspect in the angular space 100.

Figure 2:
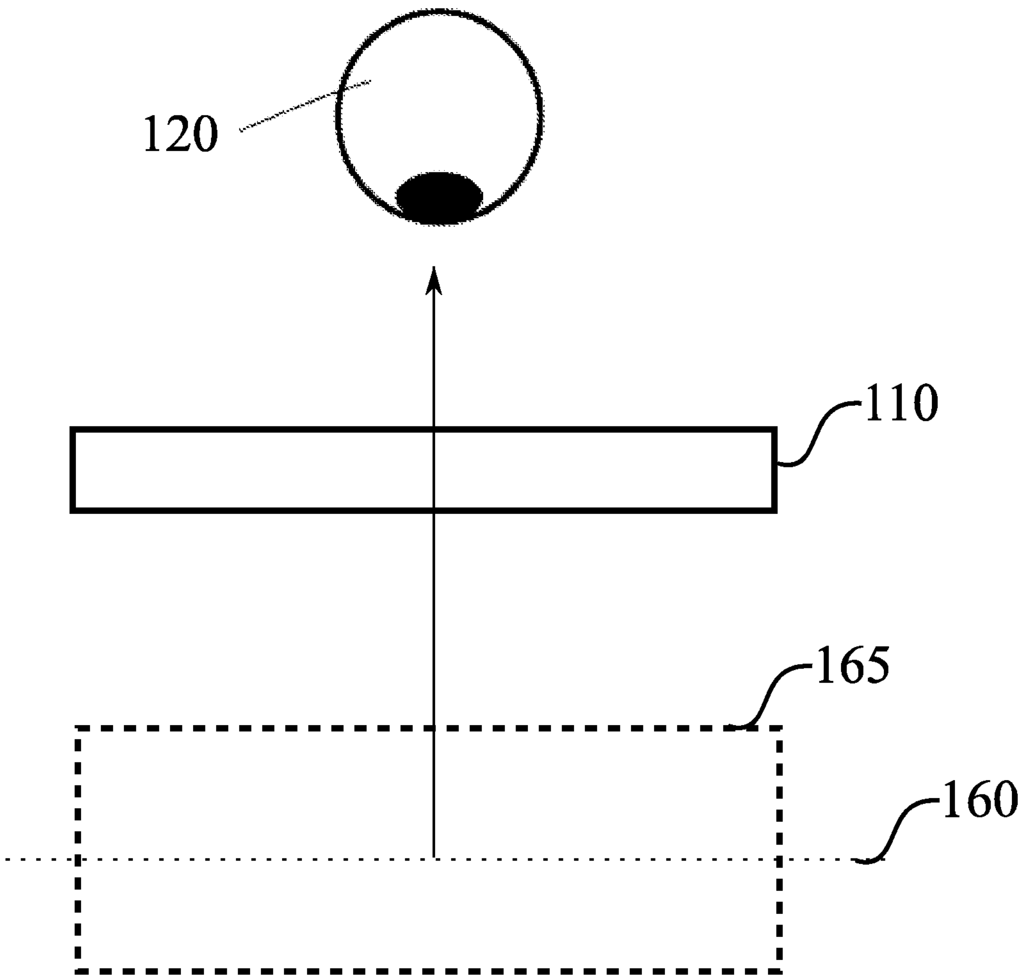
FIG. 2 illustrates an example of one focal plane in accordance with at least some embodiments of the present invention.

FIG. 2 illustrates an example of a focal plane in accordance with at least some embodiments of the present invention. In FIG. 2, eye 120 is shown similarly as in FIG. 1. One focal plane from eye 120 is denoted by 160. Said focal plane 160 is generated beyond an optical waveguide, such as optical waveguide 110 in FIG. 1, when looking from the perspective of eye 120.

Light rays corresponding to a specific pixel or source point may exit the optical waveguide(s) 110 at specific angles at different locations on a surface of the optical waveguide 110, for light to be perceived as originating from a specific focal plane, e.g., a full colour image at a certain focal distance. That is to say, an exit angle of the light ray 104 may be a function of the exit location, not only of the incident ray angle, as in infinite-focal-length near-to-the-eye displays. Such behaviour may be realized by the elements 112 and 112*a* shown in FIG. 1.

Concerning the use of optical waveguides, one challenge is related to different focal planes. For instance, in some applications it may be desirable to switch from one focal plane to another or generate for example full colour images on top of each other at different focal planes. Alternatively, it may be desirable to have a large Depth of Focus, DOF. The DOF is denoted by 165 in FIG. 2 and it refers to an area wherein the focus is acceptable. Embodiments of the present invention therefore enable generation of different focal planes using light signals with different sets of spectral characteristics, switching between focal planes and large DOF.

For instance, light signals 104 having a first set of distinct spectral characteristics may be used to generate a first image at a first focal plane. Alternatively, or in addition, light signals 104 having a second set of distinct spectral characteristics may be used to generate a second image at a second focal plane. The first and the second images may be full colour images. That is to say, full colour images may be produced for different focal planes. In some embodiments, the first and the second images may comprise one color only, or a part of a color space, instead of the full colour image. In some embodiments, the first and the second images may be the same, i.e., comprise the same color(s), and the image may be moved from the first focal plane to the second focal plane by switching from using the first set of distinct spectral characteristics to using the second set of distinct spectral characteristics.

In some embodiments of the present invention, light sources 140 transmitting light signals 104 having a first set of distinct spectral characteristic may be shut down and light sources 140 transmitting light signals 104 having a second set of distinct spectral characteristics may be activated, thereby moving for example the full colour image from the first focal plane to the second focal plane. If the light sources 140 transmitting light signals 104 having the second set of distinct spectral characteristics are shut down at some point after that and the light sources 140 transmitting light signals 104 having the first set of distinct spectral characteristics are activated again, the full colour image may be moved from the second focal plane back to the first focal plane. Hence the full colour image may jump between the first focal plane and the second focal plane depending on whether light signals 104 having the first set of distinct spectral characteristics or light signals 104 having the second set of distinct spectral characteristics are transmitted.

The full colour image may be thus moved from one focal plane to another without changing the perceived color between the images at the different focal planes as long as the ROI lies in the intersection of the focal plane gamuts. The displayed focal plane may be selected for a full colour image by selecting a certain set of distinct spectral characteristics. For example, in some embodiments, the first and the second sets of distinct spectral characteristics represent full colour images within the same ROI containing for example the same white point, so that all the colours near this white point are thus reproduced at the corresponding first and second focal planes.

Moreover, in some embodiments, the light sources 140 transmitting light signals 104 having the first set of distinct spectral characteristics and the light sources 140 transmitting light signals 104 having the second set of distinct spectral characteristics may be active at the same time, thereby generating the first and the second full colour image on top of each other. Also, the light signals 104 having the first and second set of distinct spectral characteristics may be interleaved to generate a large DOF. In practice there may be more than two sets of distinct spectral characteristics, for example ten sets. Similarly, there may be more than two focal planes.

Figure 3:
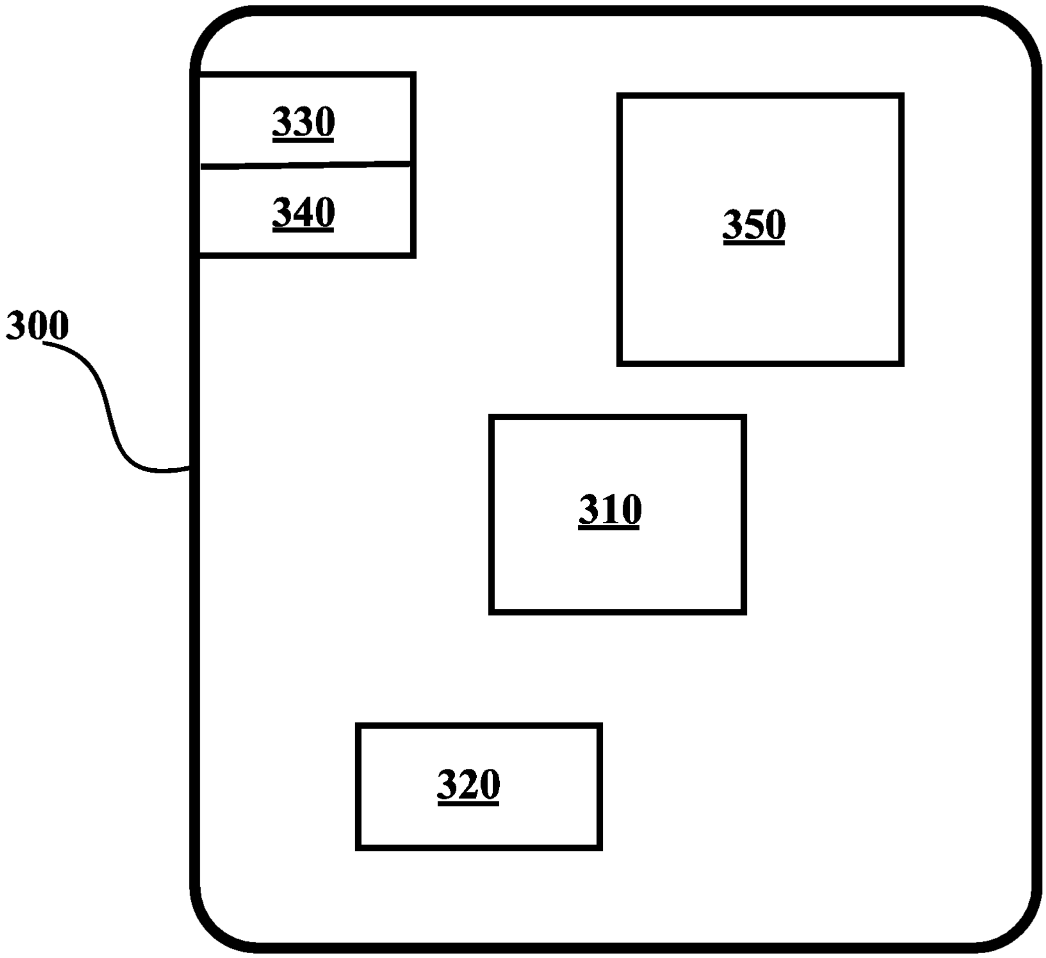
FIG. 3 illustrates an example apparatus capable of supporting at least some embodiments of the present invention.

FIG. 3 illustrates an example apparatus capable of supporting at least some embodiments of the present invention. Illustrated is apparatus 300, which may comprise, for example, a control mechanism for operating an optical waveguide arrangement, such as the optical waveguide arrangement illustrated in FIG. 1. Comprised in apparatus 300 is processor 310, which may comprise, for example, a single- or multi-core processor or microcontroller wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core designed by Advanced Micro Devices Corporation. Processor 310 may comprise at least one Qualcomm Snapdragon and/or Intel Atom processor. Processor 310 may comprise at least one Application-Specific Integrated Circuit, ASIC. Processor 310 may comprise at least one Field-Programmable Gate Array, FPGA. Processor 310 may be means for performing method steps in apparatus 300, such as transmitting and shifting. Processor 310 may be configured, at least in part by computer instructions, to perform actions. Processor 310 may be processor 150 in FIG. 1.

Apparatus 300 may comprise memory 320. Memory 320 may comprise random-access memory and/or permanent memory such as non-volatile memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and apparatus 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to apparatus 300 but accessible to apparatus 300. Memory 320 may store information defining segments of primary display 100, for example.

Apparatus 300 may comprise a transmitter 330. Apparatus 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Receiver 340 may be configured to receive an input image, and transmitter 330 may be configured to output control commands to direct mirror 130, where present, and light sources 140, for example, in accordance with the input image. Transmitter 430 and/or receiver 440 may be configured to operate in accordance with Wireless Local Area Network, WLAN, standards for example.

Apparatus 300 may comprise User Interface, UI, 350. UI 350 may comprise at least one of a display, a keyboard, a touchscreen, a vibrator arranged to signal to a user by causing apparatus 300 to vibrate, a speaker and a microphone. A user may be able to operate apparatus 300 via UI 350, for example to configure display parameters.

Processor 310 may be furnished with a transmitter arranged to output information from processor 310, via electrical leads internal to apparatus 300, to other devices comprised in apparatus 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to apparatus 300, from other devices comprised in apparatus 300. Such a receiver may comprise a serial bus receiver arranged to, for example, receive information via at least one electrical lead from receiver 340 for processing in processor 310. Alternatively to a serial bus, the receiver may comprise a parallel bus receiver.

Apparatus 300 may comprise further devices not illustrated in FIG. 3. For instance, apparatus 300 may comprise a Near-Field Communication, NFC, transceiver. NFC transceiver may support at least one NFC technology, such as NFC, Bluetooth, Wibree or similar technologies. In some embodiments, apparatus 300 may lack at least one device described above. For example, some devices 300 may lack UI 350.

Processor 310, memory 320, transmitter 330, receiver 340 and/or UI 350 may be interconnected by electrical leads internal to apparatus 300 in a multitude of different ways. For example, each of the aforementioned devices may be separately connected to a master bus internal to apparatus 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
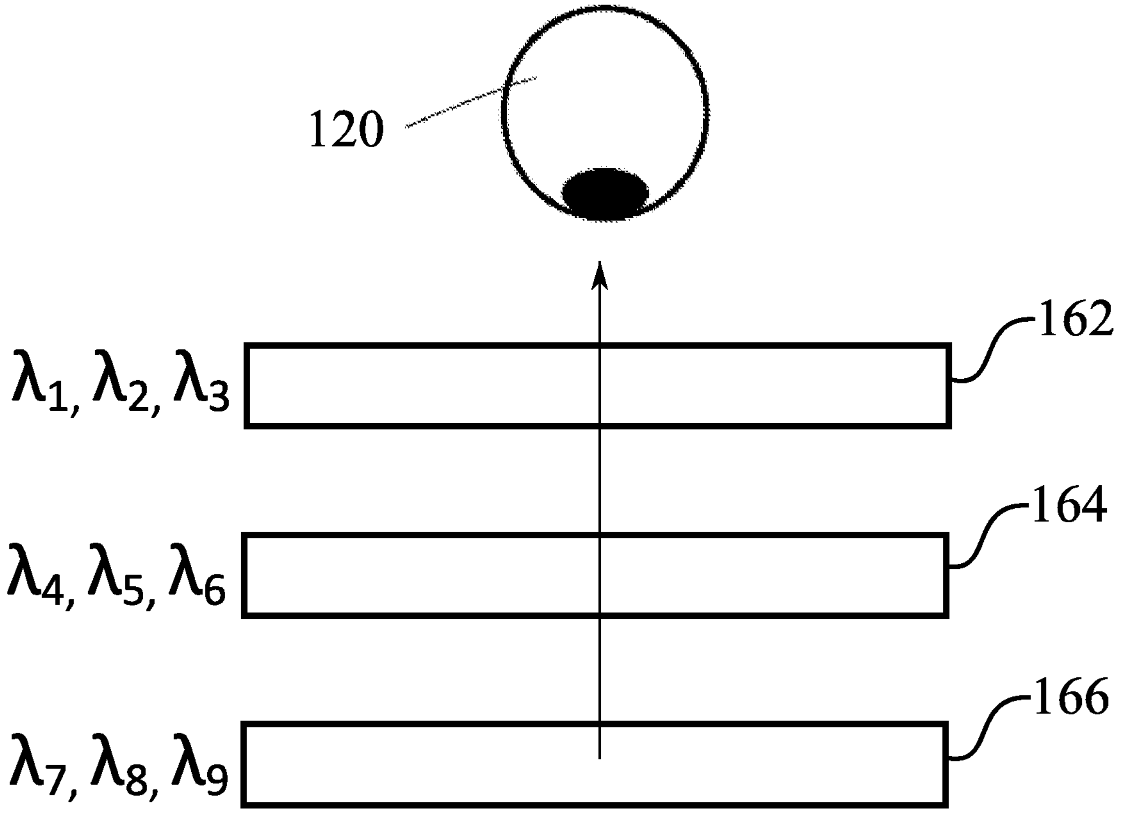
FIG. 4 illustrates a first example of multiple focal planes in accordance with at least some embodiments of the present invention.

FIG. 4 illustrates a first example of multiple focal planes in accordance with at least some embodiments of the present invention. In FIG. 4, eye 120 is shown similarly as in FIG. 2. Multiple focal planes are shown as well. First focal plane is denoted by 162, second focal plane is denoted by 164 and third focal plane is denoted by 166. Similarly as in case of FIG. 2, said multiple focal planes 162, 164 and 166 may be generated beyond an optical waveguide, such as optical waveguide 110 in FIG. 1, when looking from the perspective of eye 120.

As shown in FIG. 4, different sets of spectral characteristics ($\lambda_1$, $\lambda_2$, $\lambda_3$), ($\lambda_4$, $\lambda_5$, $\lambda_6$), ($\lambda_7$, $\lambda_8$, $\lambda_9$), i.e., spectral peaks, may be used for generating, e.g., full colour images at different focal planes. For instance, a first full colour image may be generated at first focal plane 162 using first spectral characteristics, such as distinct wavelengths $\lambda_1$, $\lambda_2$ and $\lambda_3$. That is to say, said first spectral characteristics may comprise a first set of at least three distinct spectral characteristics ($\lambda_1$, $\lambda_2$, $\lambda_3$).

Similarly, a second full colour image may be generated at second focal plane 164 using second spectral characteristics, such as distinct wavelengths $\lambda_4$, $\lambda_5$ and $\lambda_6$. Said second spectral characteristics may comprise a second set of at least three distinct spectral characteristics as well, wherein each of the distinct special characteristics in the second set is different compared to the first set of distinct special characteristics, i.e., none of the distinct special characteristics in the first set can be found from the second set of distinct special characteristics. For instance, $\lambda_1$ is not in the second set of distinct special characteristics.

In some embodiments, each of the first spectral characteristics and each of the second spectral characteristics may be a distinct spectral peak. In addition, in some embodiments of the present invention, a third full colour image may be generated at third focal plane 166 using three spectral characteristics, such as distinct wavelengths $\lambda_7$, $\lambda_8$ and $\lambda_9$. In some embodiments, $\lambda_1\lambda_4$ and $\lambda_7$ may be close to each other in spectrum (but the difference may be for example larger than, or equal to, 5 nm or 10 nm, within the desired ROI), thereby enabling a short rotation. As shown in FIG. 4, each spectral characteristic may have its own focal plane, i.e., each spectral characteristic may be used to generate an full colour image at one certain focal plane only.

With reference to FIG. 1, at least one optical waveguide 110 may be arranged for example to generate a first full colour image at first focal plane 162 when light signals 104 having the at least one first spectral characteristic, such as $\lambda_1$, $\lambda_2$ and/or $\lambda_3$, are received from at least one light source 140. Similarly, at least one optical waveguide 110 may be arranged to generate a second full colour image at second focal plane 164 when light signals 104 having the at least one second spectral characteristic, such as $\lambda_4$, $\lambda_5$ and/or $\lambda_6$, are received from at least one light source 140. The at least one first spectral characteristic may form a first set of distinct spectral characteristics and the at least one second spectral characteristic may form a second set of distinct spectral characteristics.

In some embodiments, fuzzy focal planes may exist in addition to, or instead of, specific focal planes. A fuzzy focal plane may refer to a focal plane wherein the image is not actually located precisely at one focal depth, but in a (small) region thereabout. Thus, it is possible to get a reasonably good approximation of a continuous range of focal planes by a discrete number of 'actual' focal planes. Programmatically it may also be possible to utilize two (or more) such focal planes to simulate any actual focal plane in-between (that is, a precise focal depth, rather than large depth of field).

In some embodiments, processor 150 may be configured to control at least one light source 140 to transmit light signals having the first set of distinct spectral characteristics by using three light sources for example, thereby generating the first full colour image at first focal plane 162. At some point after that, processor 150 may control at least one light source 140 to transmit light signals having the second set of distinct spectral characteristics by using the same three light sources or additional light sources, thereby generating the second full colour image at second focal plane 164. In some embodiments, processor 150 may control at least one light source 140 to cease transmission of light signals having the first set of distinct spectral characteristics. Consequently, the full colour image may be shifted from the first focal plane to the second focal plane, if the first and the second full colour images are the same. In some embodiments, the first and the second signals may not be the same though, i.e., different full colour images may be displayed at different focal planes.

Moreover, in some embodiments, processor 150 may then control at least one light source 140 to cease transmission of light signals having the second set of distinct spectral characteristics and to start transmitting light signals having the first set of distinct spectral characteristics. Hence the full colour image may jump between first focal plane 162 and second focal plane 164 depending on whether light signals having the first set of distinct spectral characteristics ($\lambda_1$, $\lambda_2$, $\lambda_3$) or light signals having the second set of distinct spectral characteristics ($\lambda_4$, $\lambda_5$, $\lambda_6$) are transmitted by at least one light source 140 and conveyed to user's eye 120 via at least one optical waveguide 110.

The distinct spectral characteristics of the first set ($\lambda_1$, $\lambda_2$, $\lambda_3$) and the second set ($\lambda_4$, $\lambda_5$, $\lambda_6$) may be chosen so that the corresponding gamuts contain the same ROI, even though the first and the second full colour images are at different focal planes. That is to say, the same visual appearance may be provided and all the colours may be presented at the different focal planes.

That is to say, the focal plane of the optical waveguide arrangement may be shifted from first focal plane 162 to second focal plane 164 by shutting down transmission of light signals having the first set of spectral characteristics ($\lambda_1$, $\lambda_2$, $\lambda_3$) and activating transmission of light signals having the second set of spectral characteristics ($\lambda_4$, $\lambda_5$, $\lambda_6$). The focal plane of the optical waveguide arrangement may be hence shifted from first focal plane 162 to second focal plane 164 when a spectral characteristic of the light signals received by at least one optical waveguide 110 is shifted from the at least one first spectral characteristic to the at least one second spectral characteristic and vice versa.

As an example, three light sources 140 may be used to generate three light signals having three distinct spectral characteristics. The same three light sources 140 may be used to generate three light signals having three distinct spectral characteristics, e.g., by reconfiguring the light sources 140.

If additional light sources 140 are used, such as six in total, processor 150 may control at least one light source 140 to continue transmission of light signals having the first set of distinct spectral characteristics along with transmission of light signals having the second set of distinct spectral characteristics, thereby generating for example the first full colour image at first focal plane 162 and the second full colour image at second focal plane 164 at the same time, i.e., generating the first and the second full colour image on top of each other. In other words, a first full colour image may be generated at first focal plane 162 and a second full colour image may be generated at second focal plane 164 by activating all light sources, i.e., by transmitting light signals having the first and the second set of distinct spectral characteristics at the same time.

Figure 5:
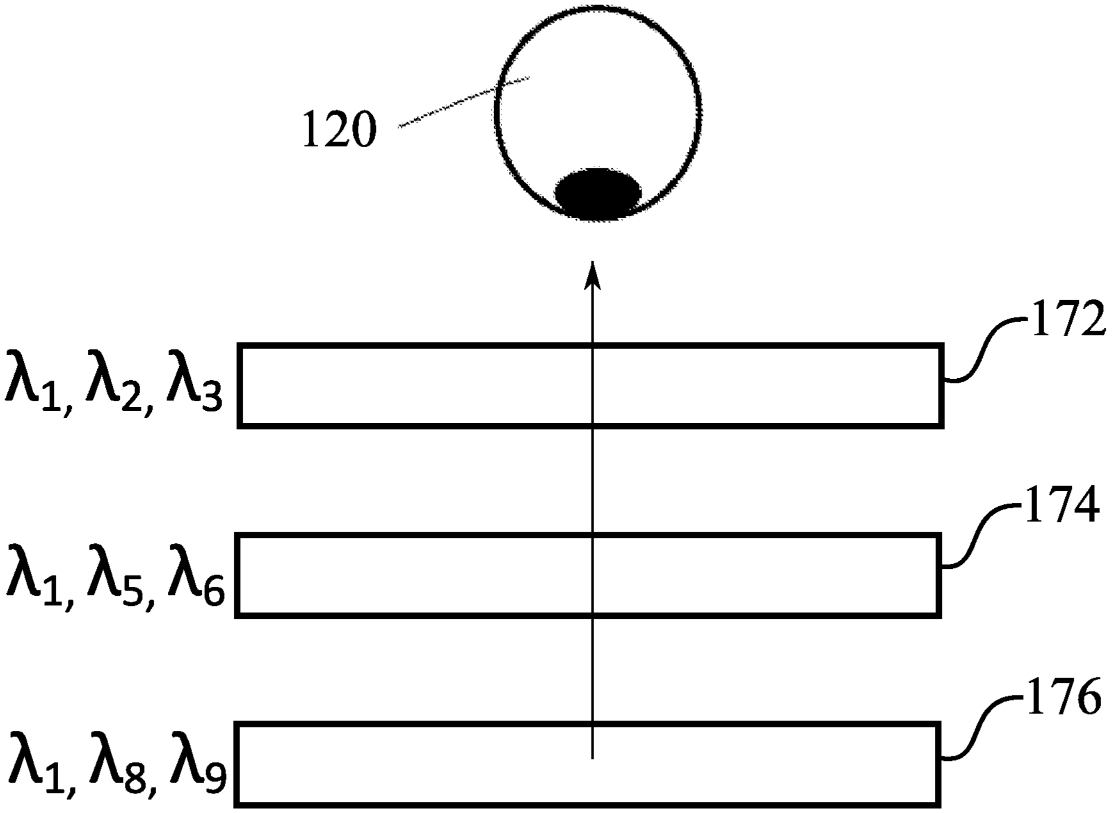
FIG. 5 illustrates a second example of multiple focal planes in accordance with at least some embodiments of the present invention.

In some embodiments, light signals having the first set of distinct spectral characteristics may be interleaved with light signals having the second set of distinct spectral characteristics. Thus, a large DOF may be generated FIG. 5 illustrates a second example of multiple focal planes in accordance with at least some embodiments of the present invention. In FIG. 5, eye 120 is shown similarly as in FIGS. 2 and 4. Multiple focal planes are shown as well. First focal plane is denoted by 172, second focal plane is denoted by 174 and third focal plane is denoted by 176. Similarly as in case of FIG. 4, said multiple focal planes 172, 174 and 176 may be generated beyond an optical waveguide, such as optical waveguide 110 in FIG. 1, when looking from the perspective of eye 120.

As shown in FIG. 5, in some embodiments of the present invention, for example a first full colour image may be generated at first focal plane 172 using light signals having first spectral characteristics (such as distinct wavelengths $\lambda_1$, $\lambda_2$ and $\lambda_3$), a second full colour image may be generated at second focal plane 174 using light signals having second spectral characteristics (such as distinct wavelengths $\lambda_1$, $\lambda_5$ and $\lambda_6$) and a third full colour image may be generated at third focal plane 176 using light signals having third spectral characteristics (such as distinct wavelengths $\lambda_1$, $\lambda_8$ and $\lambda_9$).

Hence, at least one spectral characteristic may be the same in all sets of spectral characteristics, such as $\lambda_1$ as shown in FIG. 5, thereby requiring less light sources if different light sources are used for generating light signals having the first, second and third spectral characteristics. Alternatively, faster reconfiguration is possible if the same light sources 140 are used for generating multiple sets of spectral characteristics, because there is no need to reconfigure the at least one light source for generating a full colour image on a different focal plane. Thus, the use of a common spectral characteristic enables more efficient operation for generating multiple focal planes. In some embodiments, exactly one spectral characteristic may be the same in all sets of spectral characteristics.

Figure 6:
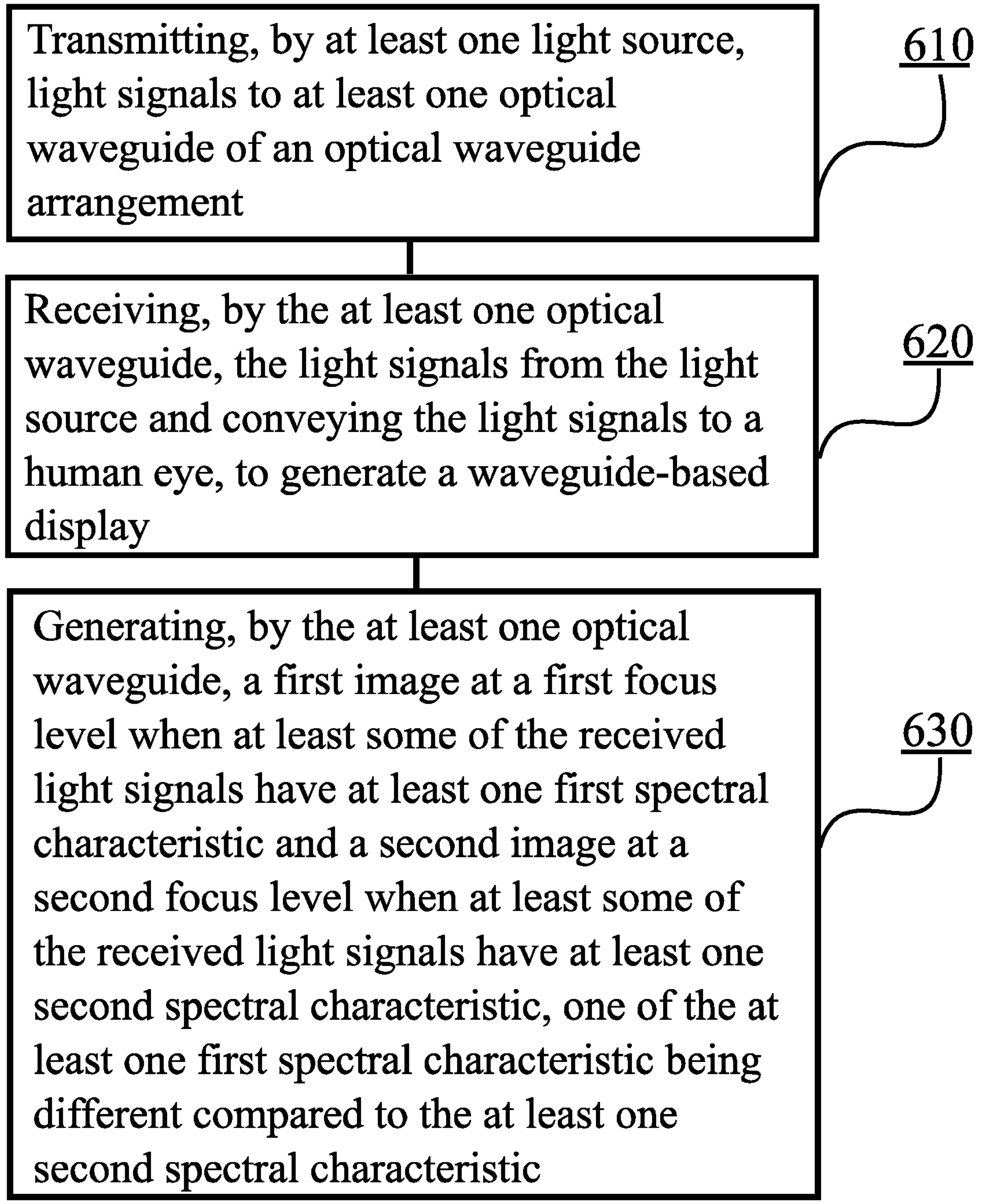
FIG. 6 illustrates a flowchart of a method in accordance with at least some embodiments of the present invention.

FIG. 6 is a flow graph of a method in accordance with at least some embodiments of the present invention. The phases of the illustrated method may be performed in an optical waveguide arrangement or by apparatus 300 of FIG. 3, or in a control mechanism configured to control the functioning thereof, when installed therein.

The method may comprise, at step 610, transmitting, by at least one light source, light signals to at least one optical waveguide of an optical waveguide arrangement. Moreover, the method may comprise, at step 620, receiving, by the at least one optical waveguide, the light signals from the light source and conveying the light signals to a human eye, to generate a waveguide-based display. Finally, the method may comprise, at step 630, generating, by the at least one optical waveguide, a first image at a first focal plane of the optical waveguide arrangement when at least some of the received light signals have a set of first spectral characteristics and a second image at a second focal plane of the optical waveguide arrangement when at least some of the received light signals have a set of second spectral characteristics, at least one spectral characteristic of the set of first spectral characteristics being different compared to the set of second spectral characteristics. In some embodiments, the first and second images may comprise colors sufficient to create perceptions of full color images, while in some embodiments partial region of a color space, or even a single color, may be comprised.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in HMDs and HUDs.

ACRONYMS LIST

ASIC Application-Specific Integrated Circuit
DOF Depth of Focus

FPGA Field-Programmable Gate Array
HMD Head-Mounted Display
HUD Head-Up Display
LCOS Liquid Crystal on Silicon
LED Light-Emitting Diode
NFC Near-Field Communication
MEMS Microelectromechanical System
ROI Region of Interest
UI User Interface
WLAN Wireless Local Area Network

REFERENCE SIGNS LIST

| | |
|---|---|
| 100 | light field |
| 102 | optical guides |
| 103 | in-coupling structure |
| 104 | light |
| 110 | waveguide |
| 112 | elements |
| 114 | directed light |
| 120 | eye(s) |
| 130 | mirror |
| 140 | light sources |
| 150 | processor |
| 160-166, 170-176 | focal planes |
| 300-350 | structure of the apparatus of FIG. 3 |
| 610-630 | phases of the method of FIG. 6 |

The invention claimed is:

1. An optical waveguide arrangement comprising:

at least one light source arranged to transmit light signals to one optical waveguide of the optical waveguide arrangement; and said one optical waveguide, wherein said one optical waveguide is arranged to receive the light signals from the at least one light source and to convey the light signals, to generate a waveguide-based display, said one optical waveguide being further arranged to generate a first image at a first focal plane of the optical waveguide arrangement when at least some of the received light signals have a first set of distinct spectral characteristics and to generate a second image at a second focal plane of the optical waveguide arrangement when at least some of the received light signals have a second set of distinct spectral characteristics, wherein at least one spectral characteristic of the first set of distinct spectral characteristics is different compared to the second set of distinct spectral characteristics, wherein the optical waveguide arrangement is such that a perceived focal plane of an image produced by the optical waveguide arrangement is shifted from the first focal plane to the second focal plane when the spectral characteristics of the transmitted light signals are shifted from the first set of distinct spectral characteristics to the second set of distinct spectral characteristics, and a full color image jumps between the first focal plane and the second focal plane depending on whether light signals having the first set of distinct spectral characteristics or light signals having the second set of distinct spectral characteristics are transmitted and conveyed to a user's eye via said one optical waveguide.

2. The optical waveguide arrangement according to claim 1, wherein the set of first spectral characteristics comprises a first set of at least three distinct spectral characteristics and the set of second spectral characteristic comprises a second set of at least three distinct spectral characteristics.

3. The optical waveguide arrangement according to claim 2, wherein one spectral characteristic of the first set of distinct spectral characteristics is the same as one spectral characteristic of the second set of distinct spectral characteristics.

4. The optical waveguide arrangement according to claim 2, wherein all spectral characteristic of the first set of distinct spectral characteristics are different compared to the second set of distinct spectral characteristics.

5. The optical waveguide arrangement according to claim 2, wherein the first set of distinct spectral characteristics is interleaved with the second set of distinct spectral characteristics.

6. The optical waveguide arrangement according to claim 1 wherein each spectral characteristic in the first set of spectral characteristics and each spectral characteristic in the second set of spectral characteristics is a distinct spectral peak in visible spectrum.

7. The optical waveguide arrangement according to claim 1, wherein gamuts corresponding to the first set of spectral characteristics and the second set of spectral characteristics together with the waveguide arrangement comprise a Region of Interest, ROI, representing full color images.

8. The optical waveguide arrangement according to claim 1, wherein the first and the second sets of distinct spectral characteristics comprise the same white point of interest.

9. The optical waveguide arrangement according to claim 1, wherein the optical waveguide arrangement is arranged to provide the waveguide-based display as a head-mounted display.

10. A head-mounted display or a head-up display comprising an optical waveguide arrangement according to claim 1.

11. A method for an optical waveguide arrangement, comprising:

transmitting, by at least one light source, light signals to one optical waveguide of an optical waveguide arrangement;

receiving, by said one optical waveguide, the light signals from the at least one light source and conveying the light signals to a human eye, to generate a waveguide-based display; and generating, by said one optical waveguide, a first image at a first focal plane of the optical waveguide arrangement when at least some of the received light signals have a first set of distinct spectral characteristics and a second image at a second focal plane of the optical waveguide arrangement when at least some of the received light signals have a second set of distinct spectral characteristics, at least one spectral characteristic of the set of first spectral characteristics being different compared to the set of second spectral characteristics, wherein a perceived focal plane of an image produced by the optical waveguide arrangement is shifted from the first focal plane to the second focal plane when the spectral characteristics of the transmitted light signals are shifted from the first set of distinct spectral characteristics to the second set of distinct spectral characteristics, and a full color image jumps between the first focal plane and the second focal plane depending on whether light signals having the first set of distinct spectral characteristics or light signals having the second set of distinct spectral characteristics are transmitted and conveyed to a user's eye via said one optical waveguide.

12. An apparatus comprising at least one processing core, at least one memory including computer program code, the at least one memory and the computer program code being configured to, with the at least one processing core, cause the apparatus at least to:

transmit light signals to one optical waveguide of an optical waveguide arrangement, to generate a waveguide-based display and a first image at a first focal plane of the optical waveguide arrangement when at least some of the transmitted light signals have a first set of distinct spectral characteristics and a second image at a second focal plane of the optical waveguide arrangement when at least some of the transmitted light signals have a second set of distinct spectral characteristics, at least one spectral characteristic of the set of first spectral characteristics being different compared to the set of second spectral characteristics, wherein a perceived focal plane of an image produced by the optical waveguide arrangement is shifted from the first focal plane to the second focal plane when the spectral characteristics of the transmitted light signals are shifted from the first set of distinct spectral characteristics to the second set of distinct spectral characteristics, and a full colour image jumps between the first focal plane and the second focal plane depending on whether light signals having the first set of distinct spectral characteristics or light signals having the second set of distinct spectral characteristics are transmitted and conveyed to a user's eye via said one optical waveguide.

13. A computer program comprising instructions which, when the program is executed by an apparatus, cause the apparatus at least to:

transmit light signals to one optical waveguide of an optical waveguide arrangement, to generate a waveguide-based display and a first image at a first focal plane of the optical waveguide arrangement when at least some of the transmitted light signals have a first set of distinct spectral characteristics and a second image at a second focal plane of the optical waveguide arrangement when at least some of the transmitted light signals have a second set of distinct spectral characteristics, at least one spectral characteristic of the set of first spectral characteristics being different compared to the set of second spectral characteristics, wherein a perceived focal plane of an image produced by the optical waveguide arrangement is shifted from the first focal plane to the second focal plane when the spectral characteristics of the transmitted light signals are shifted from the first set of distinct spectral characteristics to the second set of distinct spectral characteristics, and a full colour image jumps between the first focal plane and the second focal plane depending on whether light signals having the first set of distinct spectral characteristics or light signals having the second set of distinct spectral characteristics are transmitted and conveyed to a user's eye via said one optical waveguide.

14. The optical waveguide arrangement according to claim 1, wherein the set of first spectral characteristics comprises a first set of at least three distinct spectral characteristics and the set of second spectral characteristic comprises a second set of at least three distinct spectral characteristics.

15. The optical waveguide arrangement according to claim 3, wherein the first set of distinct spectral characteristics is interleaved with the second set of distinct spectral characteristics.

16. The optical waveguide arrangement according to claim 4, wherein the first set of distinct spectral characteristics is interleaved with the second set of distinct spectral characteristics.

17. The optical waveguide arrangement according to claim 1, wherein each spectral characteristic in the first set of spectral characteristics and each spectral characteristic in the second set of spectral characteristics is a distinct spectral peak in visible spectrum.

18. The optical waveguide arrangement according to claim 2, wherein each spectral characteristic in the first set of spectral characteristics and each spectral characteristic in the second set of spectral characteristics is a distinct spectral peak in visible spectrum.

19. The optical waveguide arrangement according to claim 3, wherein each spectral characteristic in the first set of spectral characteristics and each spectral characteristic in the second set of spectral characteristics is a distinct spectral peak in visible spectrum.

* * * * *